Figure 3:
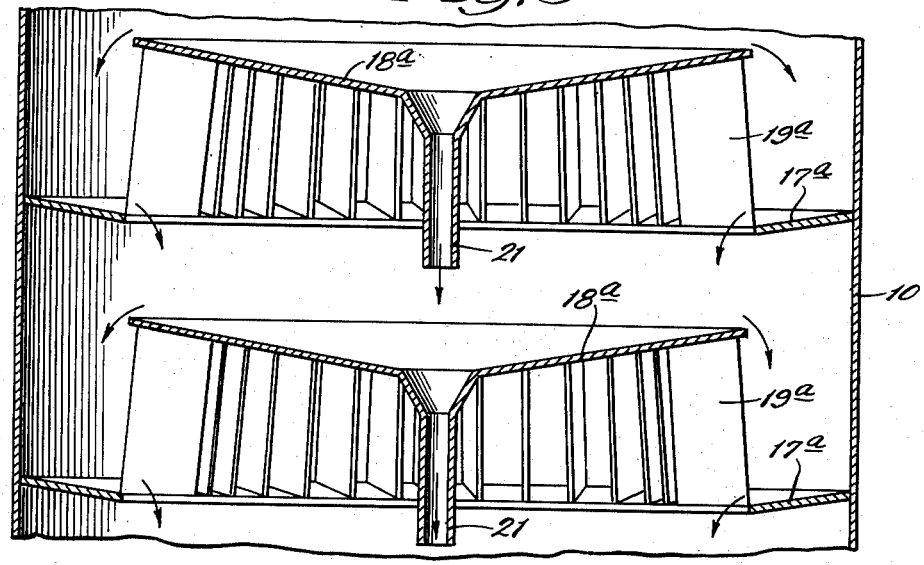

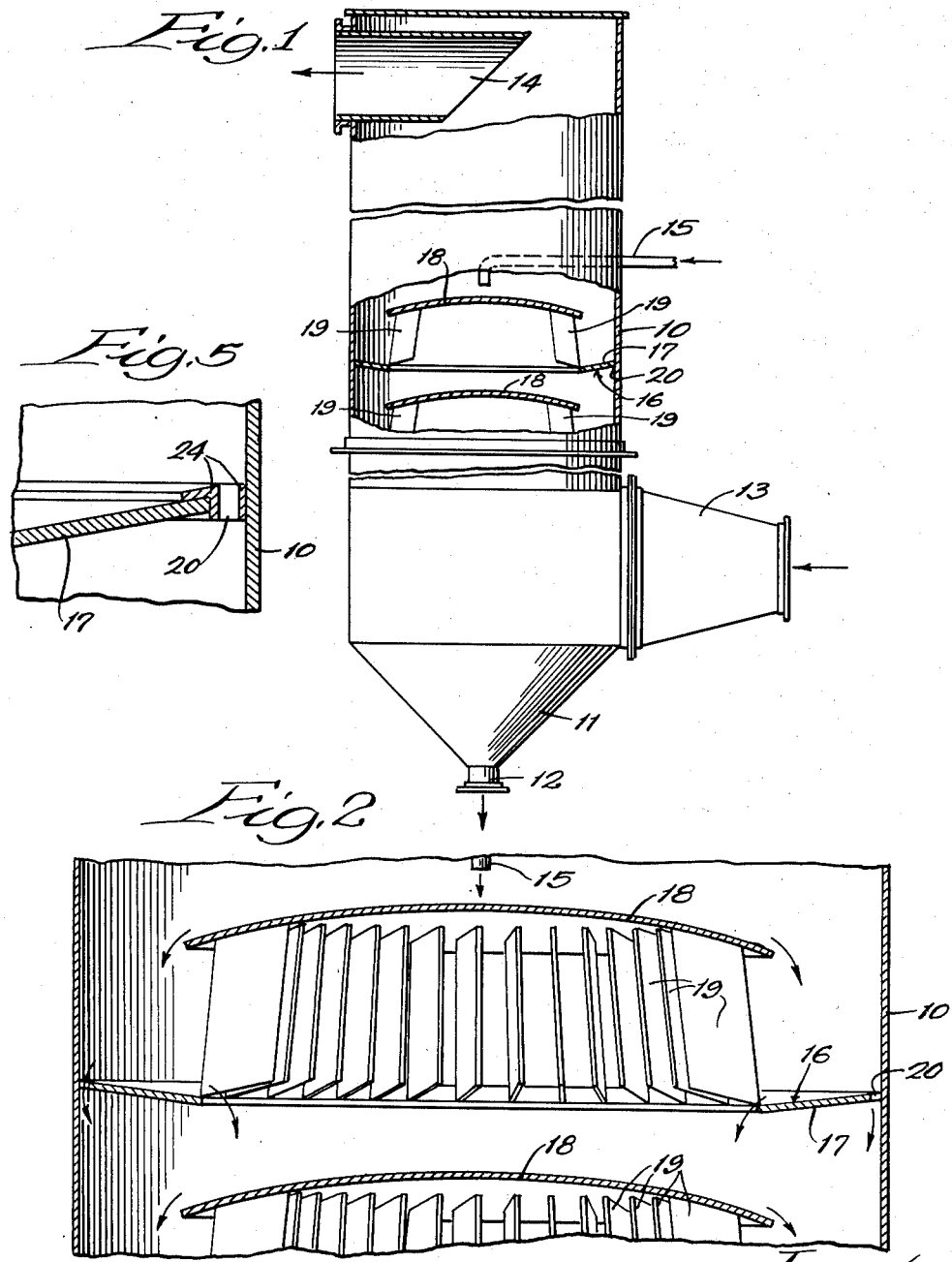

Patented May 13, 1952

2,596,106

UNITED STATES PATENT OFFICE 2,596,106

COLUMN APPARATUS

Claude B. Schneible, Detroit, Mich.

Application November 22, 1947, Serial No. 787,535

5 Claims. (Cl. 261—79)

This invention relates to column apparatus, and more particularly to intimate contact equipment for the purpose of creating an intimate contact between liquid and gas, or vapor, or both.

In columns and towers heretofore used in which a liquid was passed countercurrent to gases or vapors, considerable difficulty was experienced in thoroughly contacting a large amount of liquid. The liquid, in such prior practice, meeting the rotating annulus of gas or vapor, was broken into fine particles or atomized to create an intimate contact. The liquid volume is therefore restricted by the atomizing ability of the gas or vapor. At a low gas (vapor) velocity, the atomization is not satisfactory, and at too high a velocity, the entrainment is too great. There is, therefore, a fixed relation between the weight of the liquid and the velocity of the gas or vapor.

In apparatus where gases are caused to rotate within the contact tower so as to thereby atomize the liquid, considerable difficulty is experienced in passing the liquid into lower portions of the apparatus without causing the same to be atomized. Further, it is desired to have such liquid by-passed into lower portions of the apparatus so that, in its passage downwardly through the by-pass zones, it is effective for diluting the body of liquid to prevent crystallization of acids, alkalies, and for other reasons.

An object of the present invention is to provide apparatus in which liquid is fed to both sides of the rotating annulus so that the annulus, in effect, is between the liquid by-passes and is effective for peeling off portions of such by-passed liquid as it passes successively through the baffles of the apparatus.

Practice shows that, in many applications, it is desirable to circulate a greater quantity of liquid than the apparatus can atomize, and it is one purpose of this invention to provide apparatus capable of circulating such greater quantity of liquid. A further object is to provide apparatus in which liquid is brought into intimate contact with gases or vapor, while at the same time providing means for circulating liquid through the apparatus which is greater than the apparatus can atomize. A still further object is to provide means for passing an excess of liquid downwardly through the column in a quantity greater than the apparatus can atomize, while at the same time bringing the liquid in at lower spaced points at which the liquid is finally atomized. Yet another object is to provide apparatus in which the amount of liquid by-passed from the atomization zones can be effectively controlled or regulated. A still further object is to provide means whereby a body of liquid is provided in quantity at different stages throughout a column for the purpose of diluting the liquid being atomized and for preventing crystallization of acids, alkalies, and other materials. Other specific objects and advantages will appear as the specification proceeds.

The invention is illustrated, in a preferred embodiment, by the accompanying drawing, in which—

Figure 4:
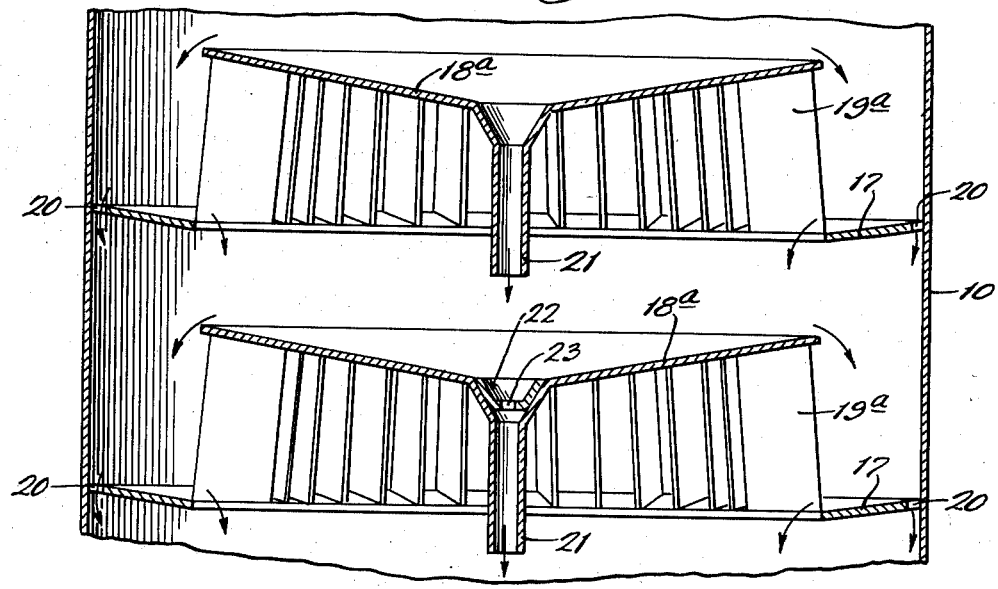

Figure 1 is a broken vertical sectional view of apparatus showing the by-pass passage in the rings of the baffles; Fig. 2, a broken enlarged sectional view of the structure shown in Fig. 1; Fig. 3, a vertical sectional view of a column structure in which the by-pass is centrally located with respect to the plate of the baffles; Fig. 4, a vertical sectional view of the structure embodying my present invention in which the by-pass passages extend both through the ring and through the plate of the baffle structure; and Fig. 5, a sectional detail view showing means for regulating the flow through the passages in the baffle ring.

In the illustration given, 10 designates a casing providing an elongated vertical chamber. The casing 10 is provided at its bottom with a conical outlet portion 11 and with an outlet pipe 12. An inlet pipe 13 for the incoming gases, vapors, or other medium, is provided, and the inlet is preferably tangential to the cylindrical body of the casing, as shown more clearly in my Patent No. 2,114,786, dated April 19, 1938.

The casing is also provided at the top with an outlet pipe 14. A liquid pipe 15 introduces water or other liquid into the interior of the chamber.

Within the casing 10, I provide a number of baffles 16. Each of the baffles 16 comprises a ring 17, a plate 18, and vanes 19 extending between the ring 17 and plate 18, all as shown in greater detail in my said Patent No. 2,114,786. The vanes 19 are inclined so that as the medium is drawn upwardly under suction, the medium is caused to form a rotating annulus in the area around and above the vanes. The descending water or other liquid is ordinarily broken into fine particles by contact with the rotating annulus.

In the illustration given in Figs. 1 and 2, the ring 17 is spaced from the casing 10 for large areas so as to provide vertical passages 20 through which liquid may pass downwardly around the rings 17. It will be understood that any suitable means for by-passing liquid around the vanes may be employed. Leaving spaces around the ring 17 between the points at which it is welded to the casing 10, is highly satisfactory because in this manner the liquid, which is thrown against the wall 10, tends to fall downwardly along the wall and to pass through the openings 20 without becoming atomized by the rising stream of gas or vapor. If desired, the rings 17, which are welded at points to the casing 10, may have any suitable by-pass openings therethrough. I prefer, however, to have such openings as near as possible to the casing wall 10 so that there will be less contact between the liquid flowing through such openings and the rising stream of medium.

In the structure in Fig. 3, the plate 18ᵃ is dished inwardly and downwardly, and at its center is provided with a downwardly-extending conduit 21. By this structure, a portion of the liquid discharged through pipe 15 is by-passed centrally of the plates so that the liquid is thus passed centrally of the rotating annulus.

Fig. 4 sets out the apparatus combining the structures shown in Figs. 1 to 3, inclusive, and thus incorporating the main idea of my invention herein. By the structure shown in Fig. 4, the liquid is by-passed not only centrally of the rotating annulus, but also laterally of the annulus. Thus, the annulus of gas is enclosed by the two by-pass streams of liquid.

In the structure shown in Fig. 4, means are provided for controlling the flow of liquid passing through the outlet pipe 21. In the illustration given, an insert or plug 22 is provided centrally, with a reduced opening 23 through which liquid passes into the pipe 21 therebelow. It will be understood that any number of such plugs having the desired size of outlet opening may be employed to regulate the flow of liquid through the central by-pass in any one or all of the plates.

In Fig. 5 is shown an insert 24, which is segmental in character and adapted to be received within the flow passages 20 of the rings 17. The insert 24 has a reduced opening and thus diminishes the amount of liquid passing through the passage 20 in which the plug is inserted.

In the operation of the apparatus, and particularly in the combined form of the apparatus illustrated in Fig. 4, liquid in the form of water, oil, solvent, acid or alkali solutions, or any other treating liquid, is discharged through pipe 15 onto the plate 18ᵃ therebelow. A portion of the liquid flows over the edges of the plates 18ᵃ, where it meets the rotating annulus of gas. A portion of the liquid also flows through the central by-pass pipe 21, thereby by-passing the rotating annulus of gas. Also, a portion of the liquid stream from pipe 15 is splashed outwardly upon the walls of the column and travels down the walls and through the by-pass passages 20. Thus, there is a by-pass stream of liquid flowing along the walls of the column and thus escaping atomization, at least in the upper baffles, and there is also a by-pass stream of liquid passing through the central portion of the rotating mass of gas.

If it is desired to restrict the flow of liquid through the central tube 21, an insert 22 may be placed therein entirely closing off the passage or merely partially closing off the passage. Similarly, the flow of liquid through the passages 20 may be closed off or diminished by inserting suitable plugs 24 therein. By this means, the flow through the central portions of the column and along the side walls thereof may be regulated to produce the desired results.

For the treatment of certain gases, vapors, or liquid, I have found it highly advantageous to provide the inner stream of by-pass liquid and the outer sheath of by-pass liquid so that the rotating gaseous body lies between, gradually peeling off portions of the by-pass liquid as the liquid passes successively through the baffles. There is thus provided an excess of liquid for dilution purposes and also for atomization and contact in the lower portion of the apparatus, such liquid having escaped atomization in the upper portion of the apparatus.

The operation shown in Figs. 1 and 2 represents the operation of the apparatus with the central openings of the plates either plugged or missing, while the structure in Fig. 3 represents such apparatus with the by-pass openings in the rings either plugged or missing. Fig. 4 represents the combined operation forming a part of this invention and in which the by-pass devices provide liquid streams on the inner and outer sides of the rotating column of gas.

In the foregoing operation, it will be understood that the inlet pipe 13 is connected to a conduit leading from a source of medium, and that the outlet pipe 14 is connected to a conduit leading to an exhaust blower, etc. If desired, however, the medium may be passed through the column by means of pressure rather than by suction. It will be understood that the drain outlet pipe 12 is connected to a conduit, which may be closed or which may lead to a separator or other container.

By the term "gas" or "gases," as used herein and in the accompanying claims, I intend to employ the term in its broader meaning to include vapors as well as gases.

This application contains common subject matter with applications Serial Nos. 787,533 and 787,534, both filed on November 22, 1947.

While in the foregoing specification I have set forth specific structures in great detail for the purpose of illustrating the invention, it will be understood that such details of structure may be varied widely by those skilled in the art without departing from the spirit of my invention.

I claim:

1. In apparatus for producing an intimate contact between liquids and gases wherein a gas is caused to move upwardly in a rotating spiral having a rarefied core to atomize a downwardly flowing liquid, a casing providing a chamber, vertically superposed baffles spaced apart in said chamber, each baffle comprising a ring and a plate thereabove with inclined vanes extending between said ring and plate, and means for discharging liquid onto the plate of an upper baffle, said liquid-receiving plate having a central opening adapted to discharge a portion of said liquid onto the plate below through the rarefied core of said rotating gas spiral, the space between said central opening and the plate immediately therebelow being unobstructed, and the ring associated with said liquid-receiving plate having by-pass openings therethrough, whereby portions of said liquid are by-passed downwardly on the inside and outside of said rotating gas without being atomized by said gas.

2. In apparatus for producing an intimate contact between liquids and gases wherein a gas is caused to move upwardly in a rotating spiral having a rarefied core to atomize a downwardly flowing liquid, a casing providing a chamber, vertically superposed baffles spaced apart in said chamber, each baffle comprising a ring and a plate therebeneath with inclined vanes extending between said ring and plate, and means for discharging liquid onto the plate of an upper baffle, at least said liquid-receiving plate being dished inwardly and downwardly and having a central outlet pipe extending through the rarefied core of said rotating gas spiral and the ring associated with said liquid-receiving plate being provided adjacent its outer periphery with by-pass openings, whereby portions of said liquid are by-passed downwardly on the inside and outside of said rotating gas without being atomized by said gas.

3. In apparatus for producing an intimate contact between liquids and gases wherein a gas is caused to move upwardly in a rotating spiral having a rarefied core to atomize a downwardly flowing liquid, a column having a gas inlet at one end portion and a gas outlet at the other, means for feeding liquid into the upper portion of the column, and baffles in said column in spaced-apart relation, said baffles being equipped with vanes for rotating the gas passing therethrough, and said baffles having also a central by-pass opening in direct communication with the plate below through the rarefied core of said rotating gas spiral and peripheral by-pass openings immediately adjacent the inner walls of said column adapted to permit streams of liquid to flow downwardly along said inner walls past said baffles, whereby portions of said liquid are by-passed downwardly on the inside and outside of said rotating gas without being atomized by said gas.

4. In apparatus for producing an intimate contact between liquids and gases wherein a gas is caused to move upwardly in a rotating spiral having a rarefied core to atomize a downwardly flowing liquid, a column having a tangential gas inlet at one end portion and a gas outlet at the other, means for feeding liquid into the upper portion of the column, vertically superposed baffles spaced apart in said column, each of said baffles comprising an upper plate having its periphery spaced from the walls of said column and a lower ring extending outwardly to the walls of said column with vanes between said ring and plate for producing a rotation of the gas passing upwardly through the column, and means for passing a gas through said inlet and for discharging the same through said outlet, at least some of said rings being provided with peripheral by-pass openings immediately adjacent to the walls of said column adapted to permit streams of liquid to flow downwardly along the inner walls of said casing past said rings, and at least some of said plates being provided with a central by-pass opening in direct communication with the plate below through the rarefied core of said rotating gas spiral, the spaces between said central by-pass opening and plate immediately therebelow being unobstructed, whereby portions of said liquid are by-passed downwardly on the inside and outside of said rotating gas without being atomized by said gas.

5. In apparatus for producing an intimate contact between liquids and gases wherein a gas is caused to move upwardly in a rotating spiral having a rarefied core to atomize a downwardly flowing liquid, a casing providing a chamber, baffles spaced apart in said chamber and comprising rings and plates with inclined vanes extending therebetween, said plates being dished inwardly and downwardly and having a central outlet pipe extending through the rarefied core of said rotating gas spiral, said plates also having their outer edges sufficiently close to said casing to produce a liquid overflow on said casing, and said rings being provided adjacent their outer periphery with by-pass openings therethrough, whereby portions of said liquid are by-passed downwardly on the inside and outside of said rotating gas without being atomized by said gas.

CLAUDE B. SCHNEIBLE.

REFERENCES CITED

The following references are of record in the file of this patent:

UNITED STATES PATENTS

| Number | Name | Date |
|---|---|---|
| 1,471,101 | Cleary | Oct. 16, 1923 |
| 1,783,813 | Schneible | Dec. 2, 1930 |
| 1,894,744 | Hawley | Jan. 17, 1933 |
| 1,980,522 | Hawley | Nov. 13, 1934 |
| 2,078,288 | Sherman | Apr. 27, 1937 |
| 2,114,786 | Schneible | Apr. 19, 1938 |
| 2,259,033 | Fisher | Oct. 14, 1941 |
| 2,354,674 | Fisher | Aug. 1, 1944 |
| 2,409,088 | Weits et al. | Oct. 8, 1946 |